US010598098B2

(12) United States Patent
Schacher et al.

(10) Patent No.: US 10,598,098 B2
(45) Date of Patent: Mar. 24, 2020

(54) METHOD AND APPARATUS FOR SHUTTING DOWN AN ENGINE

(71) Applicant: Headwind Automotive Solutions Ltd., Camrose (CA)

(72) Inventors: Galen Schacher, Camrose (CA); Blain Schacher, Camrose (CA)

(73) Assignee: Headwind Automotive Solutions Ltd., Camrose (CA)

( * ) Notice: Subject to any disclaimer, the term of this patent is extended or adjusted under 35 U.S.C. 154(b) by 99 days.

(21) Appl. No.: 14/704,613

(22) Filed: May 5, 2015

(65) Prior Publication Data
US 2015/0315983 A1 Nov. 5, 2015

(30) Foreign Application Priority Data
May 5, 2014 (CA) ...................................... 2851446

(51) Int. Cl.
*F02D 9/02* (2006.01)
*F16K 31/08* (2006.01)
*F16K 1/22* (2006.01)
*F02D 41/04* (2006.01)
(Continued)

(52) U.S. Cl.
CPC ........... *F02D 9/02* (2013.01); *F02D 41/0002* (2013.01); *F02D 41/042* (2013.01); *F02D 41/22* (2013.01); *F16K 1/221* (2013.01); *F16K 31/08* (2013.01); *F16K 31/082* (2013.01);
(Continued)

(58) Field of Classification Search
CPC .... F02D 17/04; F02D 41/0002; F02D 41/042; F02D 9/107; F02D 9/02; F02D 2009/0244; F02D 2009/0245; F02D 2009/0201; F02D 2009/0269; F02D 2009/0271; F02D 2041/0022; F16K 1/18; F16K 3/0254;
(Continued)

(56) References Cited

U.S. PATENT DOCUMENTS 3,484,074 A * 12/1969 Lynes ................... F16K 31/082
251/65
4,129,040 A * 12/1978 Hayden, Jr. ............. F02D 17/04
123/198 D
(Continued)

OTHER PUBLICATIONS

Neodymium Iron Boron vs. Samarium Cobalt. Magnetic Component Engineering. https://web.archive.org/web/20141112171130/http://www.mceproducts.com/Knowledge_Base/Articles/Neodymium_vs_Samarium.htm. Accessible on the web on Nov. 12, 2014. Obtained from archive.org on Jan. 3, 2018.*

*Primary Examiner* — Jacob A Amick
*Assistant Examiner* — Michael A Kessler
(74) *Attorney, Agent, or Firm* — Seed Intellectual Property Law Group LLP

(57) ABSTRACT

There is provided a method of shutting down an engine, the engine having an air intake, and the method having the steps of attaching a valve to the air intake, the valve having an open position that allows air to pass into the air intake; using one or more sensors, detecting one or more predetermined engine conditions indicative of a runaway state; electromagnetically actuating the valve to move to a closed position preventing air from passing into the air intake once the one or more predetermined engine conditions have been detected; and causing the valve to return to the open position once a predetermined safe state has been reached.

12 Claims, 9 Drawing Sheets

(51) Int. Cl.
*F02D 41/00* (2006.01)
*F02D 41/22* (2006.01)

(52) U.S. Cl.
CPC .... *F16K 31/084* (2013.01); *F02D 2009/0245* (2013.01); *Y02T 10/42* (2013.01)

(58) Field of Classification Search
CPC ...... F16K 31/08; F16K 31/082; F16K 31/105; F16K 31/56
USPC .... 123/198 D, 399, DIG. 11, 394, 397, 403; 251/65, 129.01, 129.02, 305
See application file for complete search history.

(56) References Cited

U.S. PATENT DOCUMENTS

| | | | | |
|---|---|---|---|---|
| 4,422,418 | A * | 12/1983 | Dorn | F02D 17/04 123/198 D |
| 5,158,262 | A * | 10/1992 | Kamerbeek | F16K 31/082 251/129.11 |
| 5,388,614 | A * | 2/1995 | Hakamada | F16K 31/082 137/625.24 |
| 5,607,140 | A * | 3/1997 | Short, III | F16K 1/226 251/305 |
| 5,823,165 | A * | 10/1998 | Sato | F02D 11/10 123/361 |
| 7,444,982 | B2 * | 11/2008 | Rivet | F02D 9/107 123/198 D |
| 2007/0186901 | A1 | 8/2007 | Rivet | |
| 2012/0240474 | A1 * | 9/2012 | Purssey | E05F 1/006 49/506 |
| 2012/0240899 | A1 | 9/2012 | Kabrich et al. | |
| 2014/0048040 | A1 | 2/2014 | Rivet | |

* cited by examiner

METHOD AND APPARATUS FOR SHUTTING DOWN AN ENGINE

BACKGROUND

Technical Field

This relates to a method and apparatus for shutting down an engine by selectively preventing air from passing into the air intake.

Description of the Related Art

In some situations, such as when diesel vehicles are used on industrial sites where there is a risk of hydrocarbons being released into the air, it is necessary to have the ability to shut down the engine should it enter a runaway state. This is often done by way of an air shut off valve or an ESD valve. An example of an air shut off valve is disclosed in U.S. Pre-Grant Publication No. 2007/0186901 (Rivet) entitled "Engine Air Intake Shut Off Valve."

BRIEF SUMMARY

According to an aspect, there is provided a method of shutting down an engine having an air intake, the method comprising the steps of attaching a valve to the air intake of the engine, the valve having an open position that allows air to pass into the air intake; using one or more sensors, detecting one or more predetermined engine conditions indicative of a runaway state; electromagnetically actuating the valve to move to a closed position preventing air from passing into the air intake once at least one predetermined engine condition has been detected; and causing the valve to return to the open position once a predetermined safe state has been reached.

According to another aspect, the valve may be biased toward the open position. The valve may be actuated by an actuator that switches between an unactuated state and an actuated state, the valve being moved to the closed position as the actuator switches to the actuated state. A connector may connect the valve and the actuator, the actuator applying a positive force to move the valve from the open position to the closed position and from the closed position to the open position. The actuator may be biased toward the unactuated state such that the valve is biased toward the open position by the actuator. The actuator may be a solenoid that is biased toward the unactuated state. The connector may comprise a rack and a pinion. The actuator may comprise a rotatable component and electromagnetically actuating the valve may comprise repelling the rotatable component from the unactuated state toward the actuated state. In the unactuated state the rotatable component may be magnetically attracted to a first rotational stop and the rotatable component may be adjacent to a second rotational stop in the actuated state. At least one of the rotatable component, the first rotational stop, and the second rotational stop comprises an electromagnet that electromagnetically actuates the actuator. The predetermined safe state may be a time delay. The at least one predetermined engine conditions may be an upper RPM threshold of the engine and the predetermined safe state may be a lower RPM threshold of the engine.

According to an aspect, there is provided an engine air intake shut off device to be attached to an air intake of an engine. The device comprises a valve attachable to the air intake of the engine, the valve having an open position that allows air to pass into the air intake and a closed position that prevents air from passing into the air intake. An electromagnetic actuator is connected to the valve, the electromagnetic actuator moving the valve to the closed position when activated. There are one or more sensors that produce signals indicative of one or more engine conditions. There is also a controller that has instructions that cause the controller to activate the electromagnetic actuator in response to a signal from the one or more sensors indicative of a runaway state, and to cause the valve to return to the open position once a predetermined safe state has been reached.

According to an aspect, the valve may be actuated by an actuator that moves between an unactuated state and an actuated state, the valve being moved to the closed position as the actuator moves to the actuated state. A connector may connect the valve and the actuator, the actuator applying a positive force to move the valve from the open position to the closed position and from the closed position to the open position. The actuator may be biased toward the unactuated state such that the valve is biased toward the open position by the actuator. The electromagnetic actuator may comprise first and second electromagnets, the first electromagnet being activated to repel a movable component from the open position to the closed position, and the second electromagnet being activated to repel the movable component from the closed position to the open position. The actuator may be a solenoid. The connector may comprise a rack and a pinion. The runaway state may be an upper RPM threshold of the engine and the predetermined safe state may be a lower RPM threshold of the engine. The predetermined safe state may be a time delay.

According to an aspect, there is provided a magnetic actuator apparatus comprising a valve, a valve actuator having a first position defined by a first stop and a second position defined by a second stop, the valve actuator opening and closing the valve as it moves between the first and second positions; a first magnetic element carried by the valve actuator and a second magnetic element carried by the first stop, wherein each of the first magnetic element and the second magnetic element is an electromagnet or a permanent magnet, and wherein at least one of the first magnetic element and the second magnetic element is an electromagnet; a controller having instructions that cause the controller to change the polarity of at least one electromagnet to electromagnetically move valve actuator from the first position toward the second position in response to a first activation signal and change the polarity of at least one electromagnet to electromagnetically move the valve actuator from the second position toward the first position in response to a second activation signal.

According to another aspect, the second stop may carry one of an electromagnet, a permanent magnet, and a ferrous element. The first magnetic element may be a permanent magnet, the second magnetic element may be a first electromagnet, and the second stop carries a second electromagnet. The first magnetic element may be an electromagnet and the second magnetic element may be a permanent magnet. One of the first and second electromagnets may be activated to repel the valve actuator, and the other one of the first and second electromagnets may be activated to attract the valve actuator. At least one of the first and second electromagnets may comprise a permanent magnet such that when the electromagnet is not activated, the valve actuator will continue to be attracted to the at least one of the first and second electromagnets.

BRIEF DESCRIPTION OF THE SEVERAL VIEWS OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method and apparatus for shutting down an engine generally will now be described with reference to FIGS. 1 through 9. It will be understood that the problem with runaway engines is primarily limited to diesel engines, however the principles discussed below could be applied to other internal combustion engines that may be at risk of entering a runaway condition. A first embodiment of the air intake valve assembly will be described with specific reference to FIGS. 1 through 3, and a second embodiment of the air intake valve assembly will be described with reference to FIGS. 6 through 9.

Figure 1:
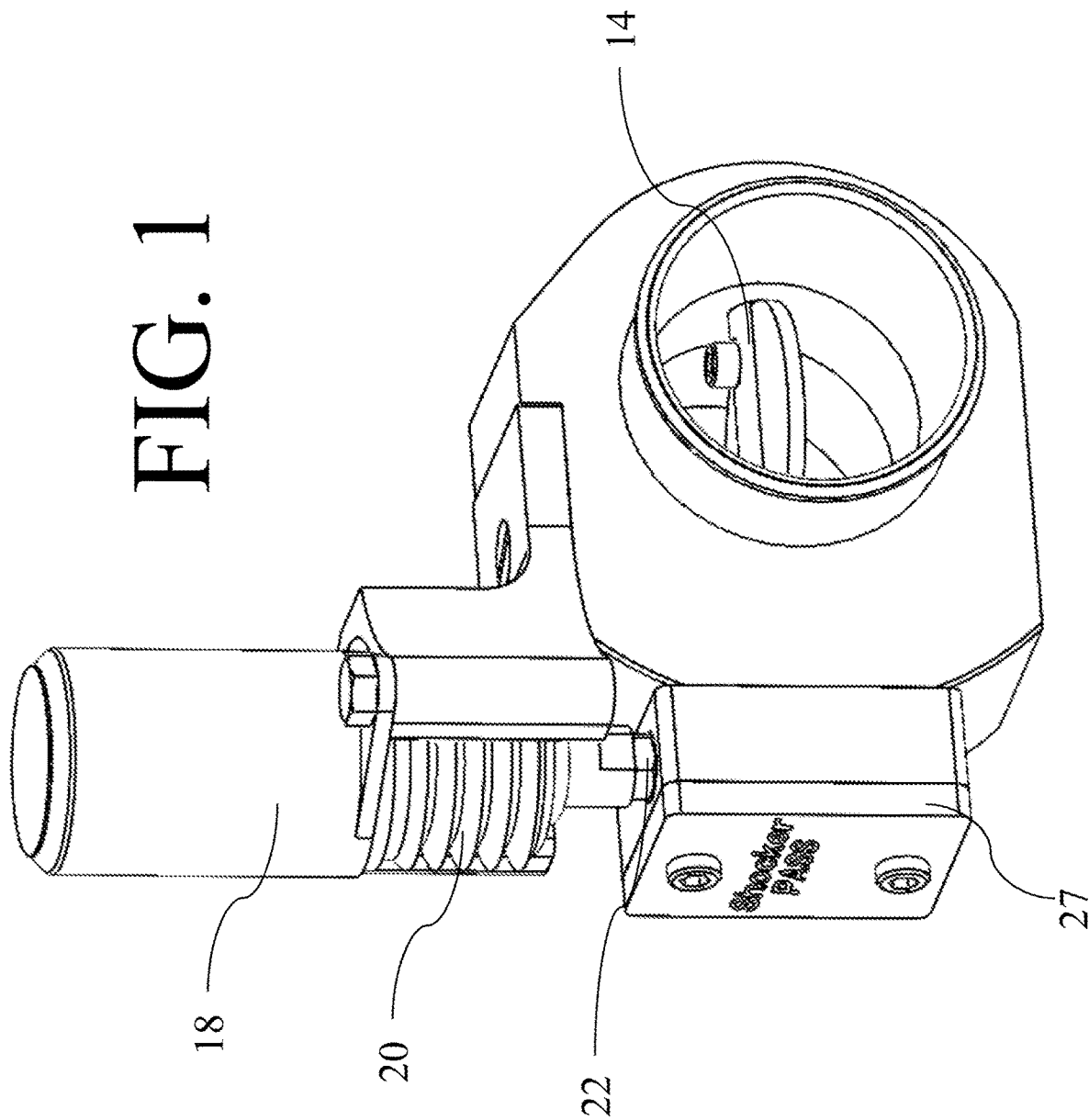
FIG. 1 is a perspective view of an air intake valve assembly with the valve in an open position.
Figure 4:
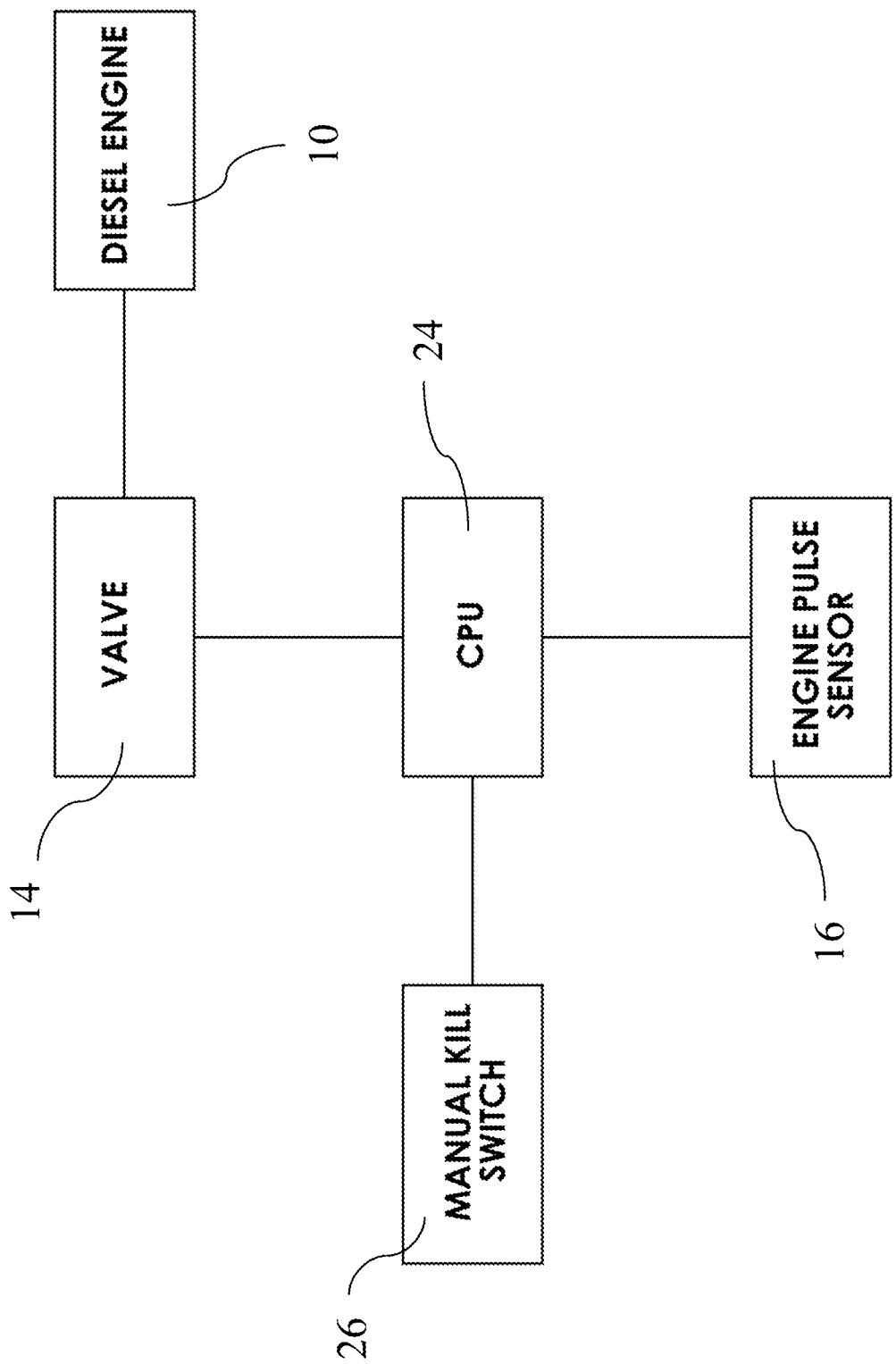
FIG. 4 is a schematic view showing the connection between components.
Figure 5:
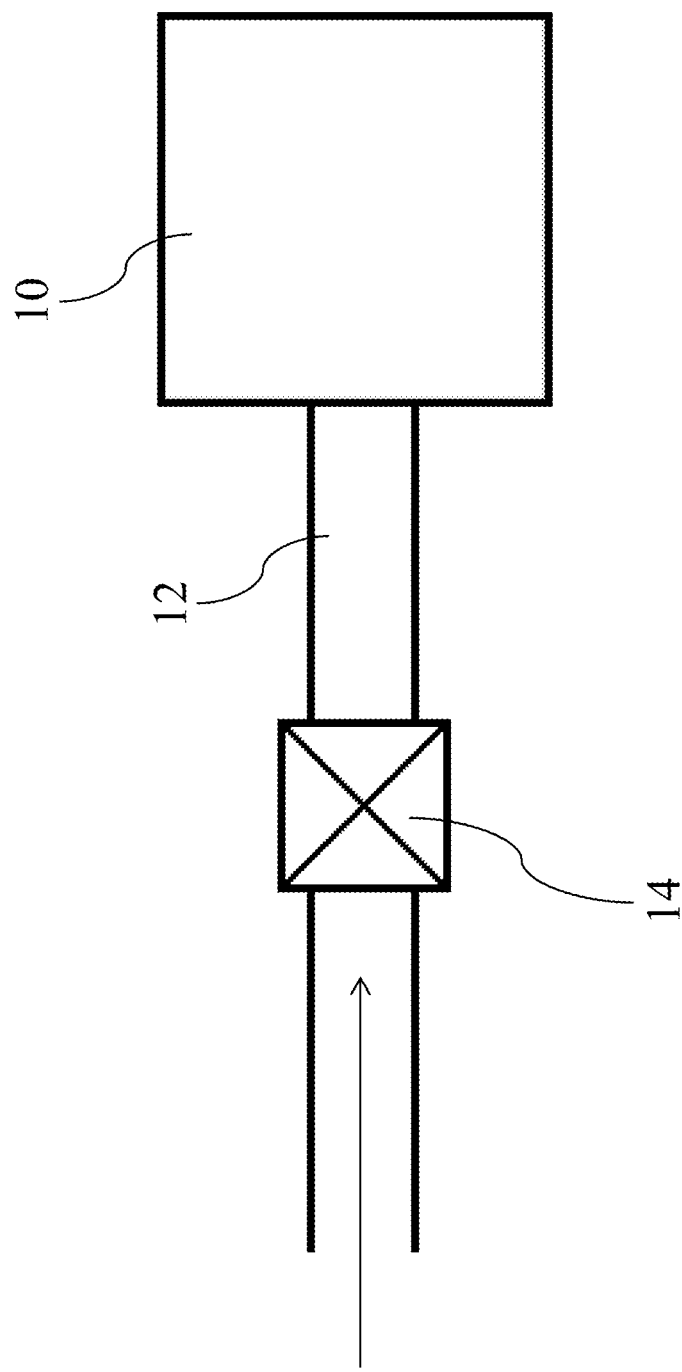
FIG. 5 is a schematic view showing the engine and air intake.

Referring to FIG. 5, engine 10 has air intake 12. The apparatus for shutting down engine 10 has a valve 14, which is attached to air intake 12. Valve 14 is biased toward an open position that allows air to pass into air intake 12 of engine 10. The air drawn through air intake 12 may be from the surrounding atmosphere, or it may be charged air, such as from a turbocharger or a supercharger on a vehicle engine. Preferably, valve 14 is a butterfly valve as shown in FIG. 1 and as is commonly used in engines, although other valves may also be used as is known in the art. Referring to FIG. 4, engine 10 has one or more sensors 16. Sensors 16 are used to measure engine parameters that may be used to identify a runaway state as are known in the art, for example, engine RPMs or temperature. Based on the type of sensors, the engine conditions that are indicative of a runaway state are predetermined. These engine conditions may, for example, be an upper RPM threshold of the engine 10 that indicates an engine speed above the normal operation parameters of the engine 10, or a temperature that is beyond the safe range of operation for the engine 10. Other conditions that indicate a potential runaway state may also be used.

Figure 3:
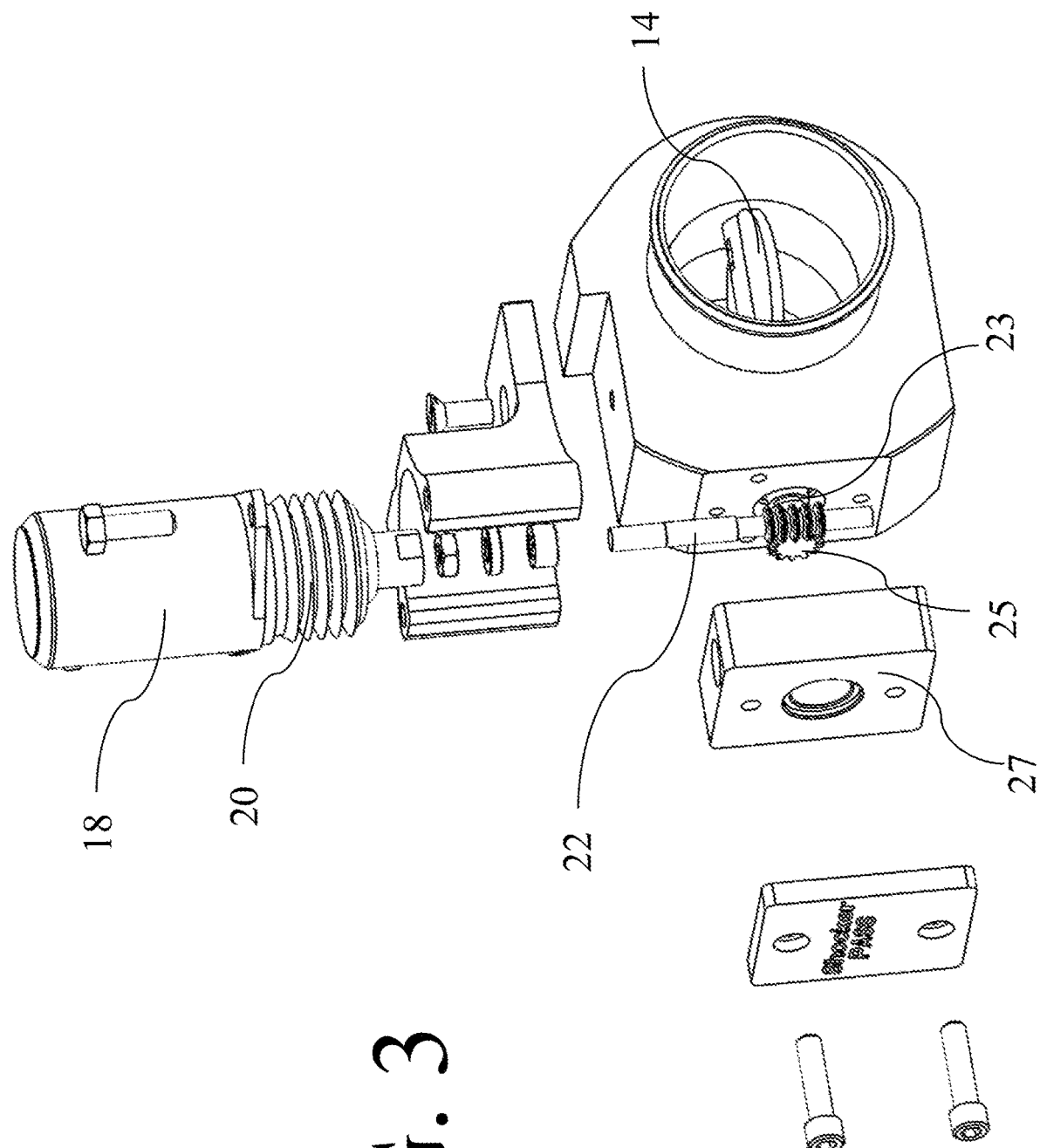
FIG. 3 is an exploded perspective view of an air intake valve assembly.

Valve 14 is connected to an electromagnetic actuator 18 by a connector 22. Electromagnetic actuator 18 may be a solenoid 20 with connector 22 connected to a rack 23 and pinion 25 to move valve 14, as shown in FIG. 3. Preferably, solenoid 20 is spring biased, such as by a pneumatic or metal spring, toward the unactuated position, such that it returns to the unactuated state when the electromagnetic force is deactivated. As can be seen, rack 23 moves laterally and engages pinion 25 to convert the lateral movement to rotational movement. Connector 22 is preferably covered by a cover 27 to protect the components. In the depicted example, valve 14 will be actuated between an open and closed position by actuator 18 as it moves between an unactuated state and an actuated state. While other types of connectors 22 may be used, preferably connector 22 is such that actuator 18 applies a positive force to both open and close the valve 14. This allows actuator 18 to be biased to the unactuated position, and as the movement of valve 14 is controlled in both directions, this also has the effect of biasing valve 14 to the open position.

Figure 6:
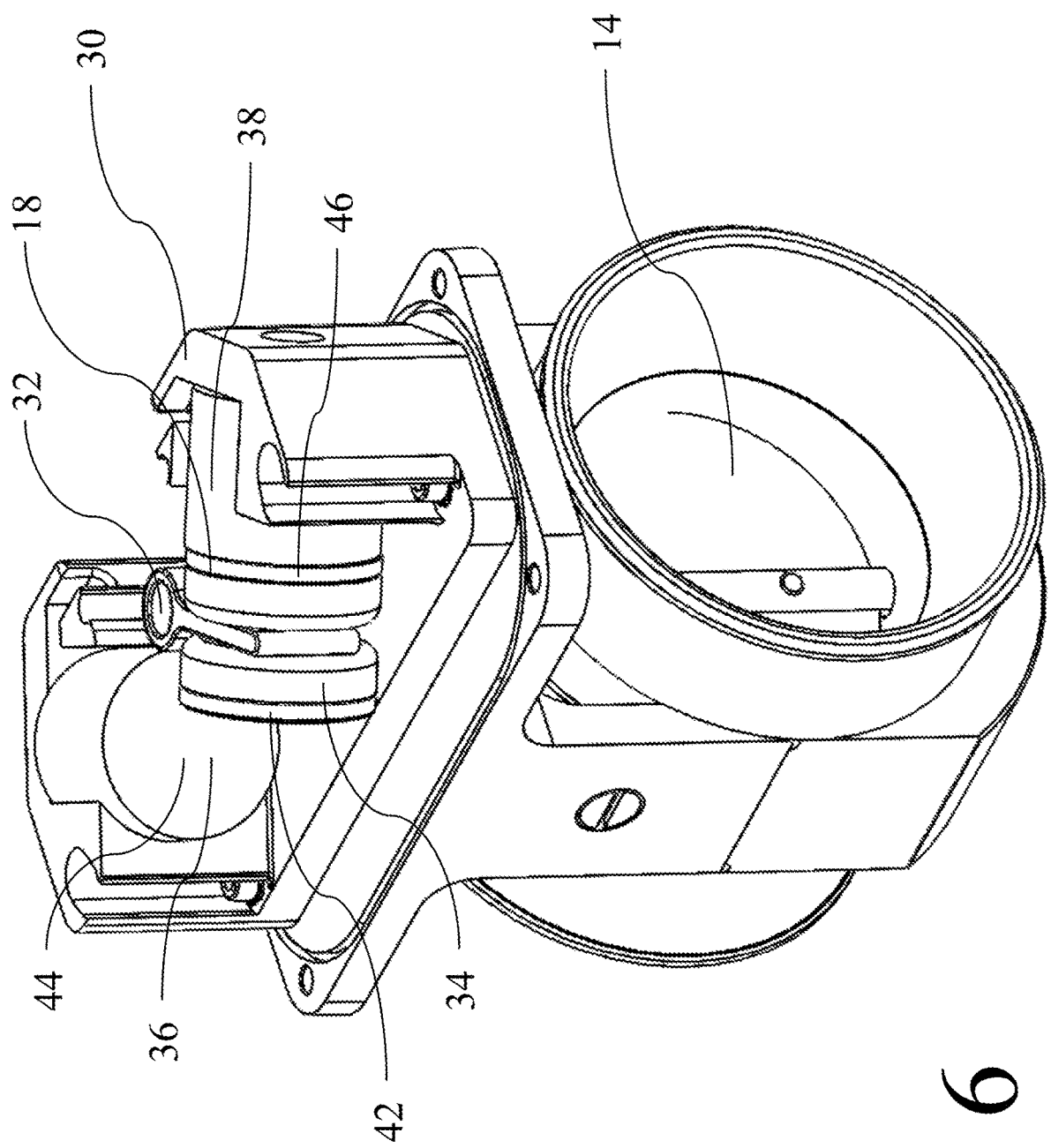
FIG. 6 is a perspective view of an alternate air intake valve assembly with the valve in a closed position.

Electromagnetic actuator 18 may also be a magnetic gate actuator 30 as shown in FIG. 6. Magnetic gate actuator 30 will be described in relation to a rotatable component that activates and deactivates. However, it will be understood that the same principles may be applied to a linearly moving component that interacts with a linearly moving valve. Magnetic gate actuator 30 has a pivotal connection 32 that allows for rotation of the rotatable component 34. Rotatable component 34 carries an actuator magnetic element 35 and rotates between a first rotational stop 36 and a second rotational stop 38. Rotational stops 36 and 38 may be stationary magnetic elements, although it will be understood that one of 36 and 38 may be a non-magnetic element, depending on the configuration of the electromagnet and permanent magnet. In the depicted example, at least one of magnetic elements 35, 36, and 38 will be an electromagnet, while the other magnetic elements may be permanent magnets, or ferrous material such that pivoting component 34 is actuated from the open position to the closed position by applying a current to an electromagnet. The electromagnet electromagnetically actuates the actuator, rotatable component 34.

Figure 7:
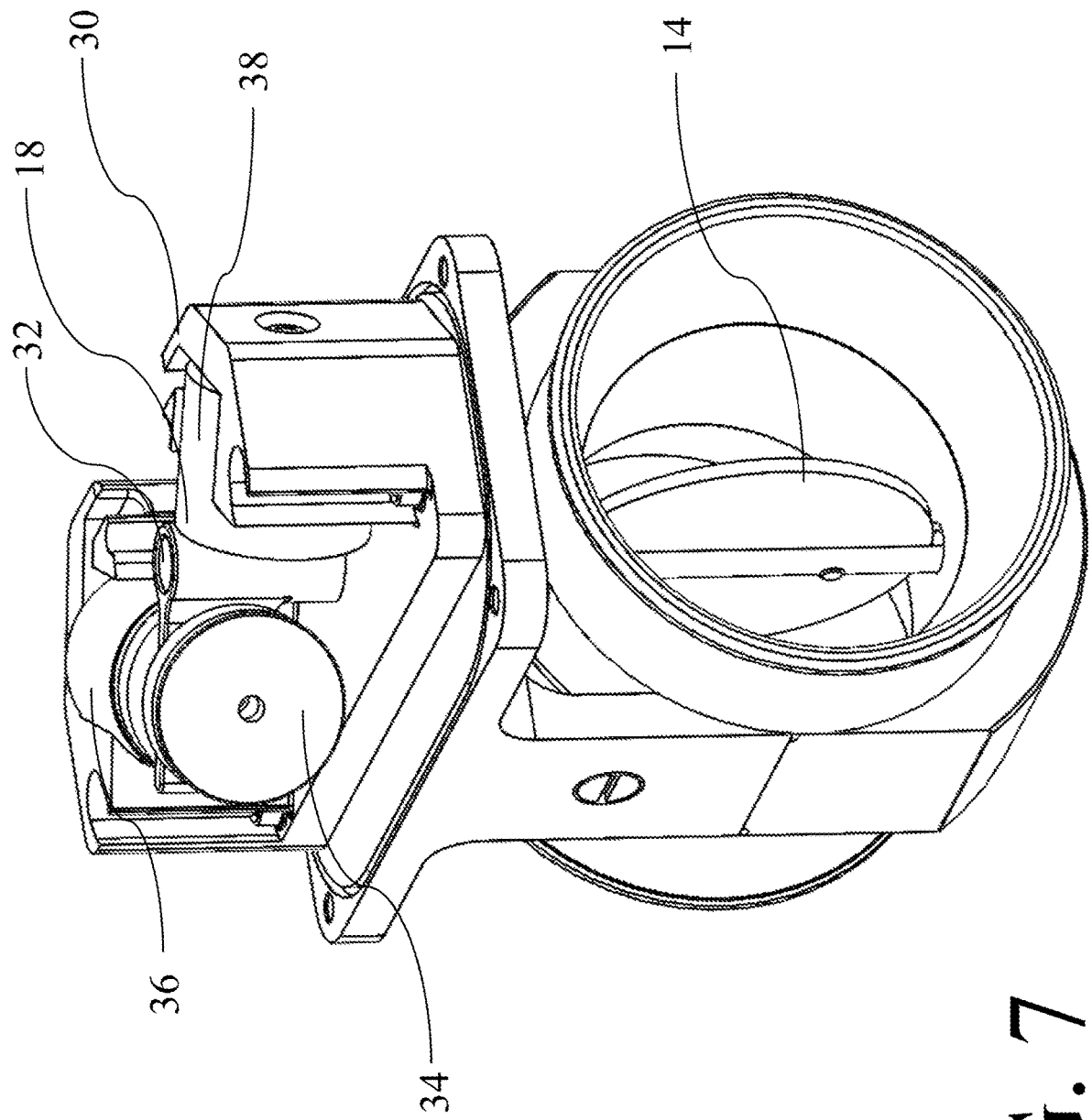
FIG. 7 is a perspective view of an alternate air intake valve assembly with the valve in an open position.
Figure 8:
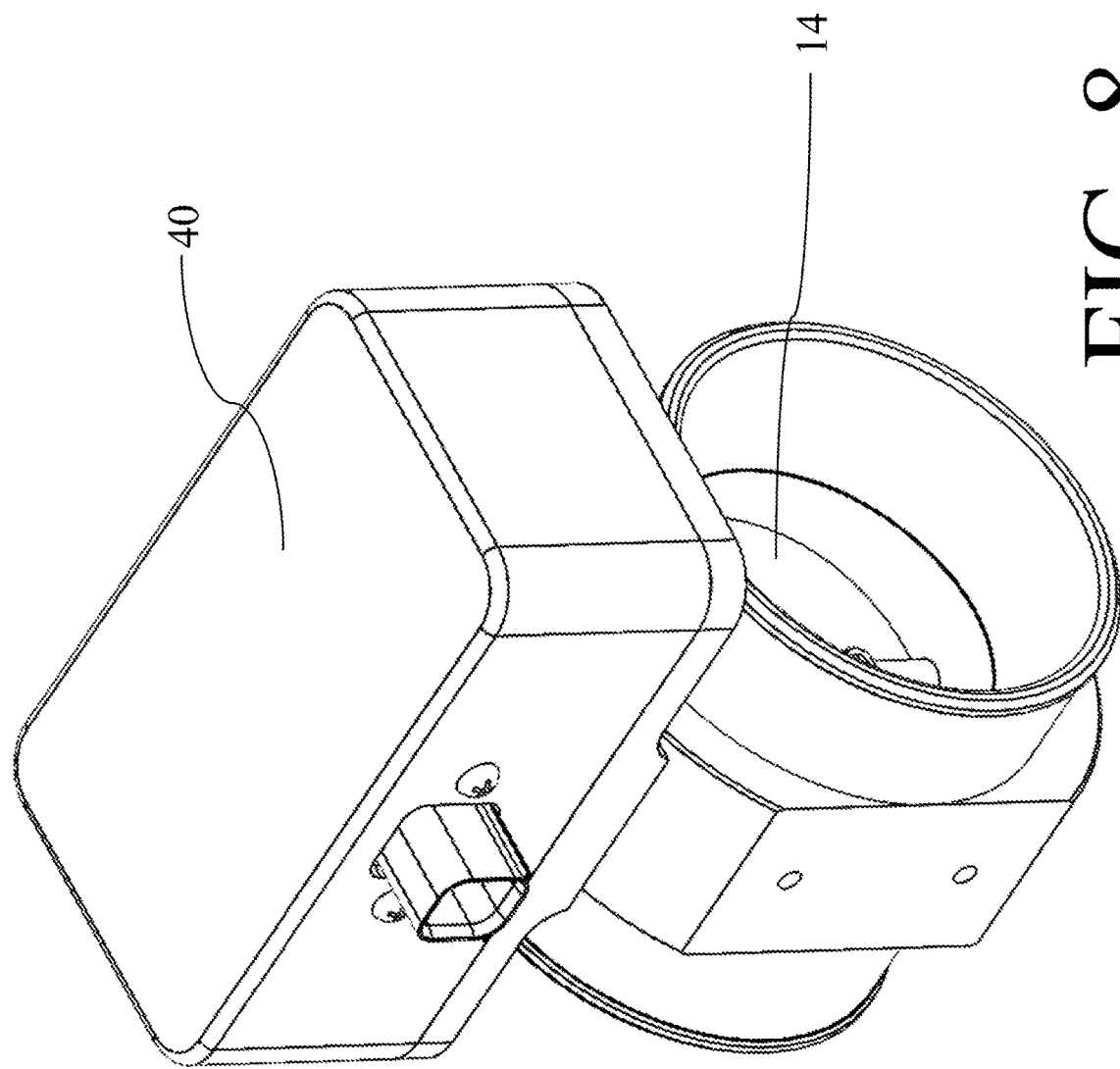
FIG. 8 is a perspective view of an alternate air intake valve assembly with a cover.
Figure 9:
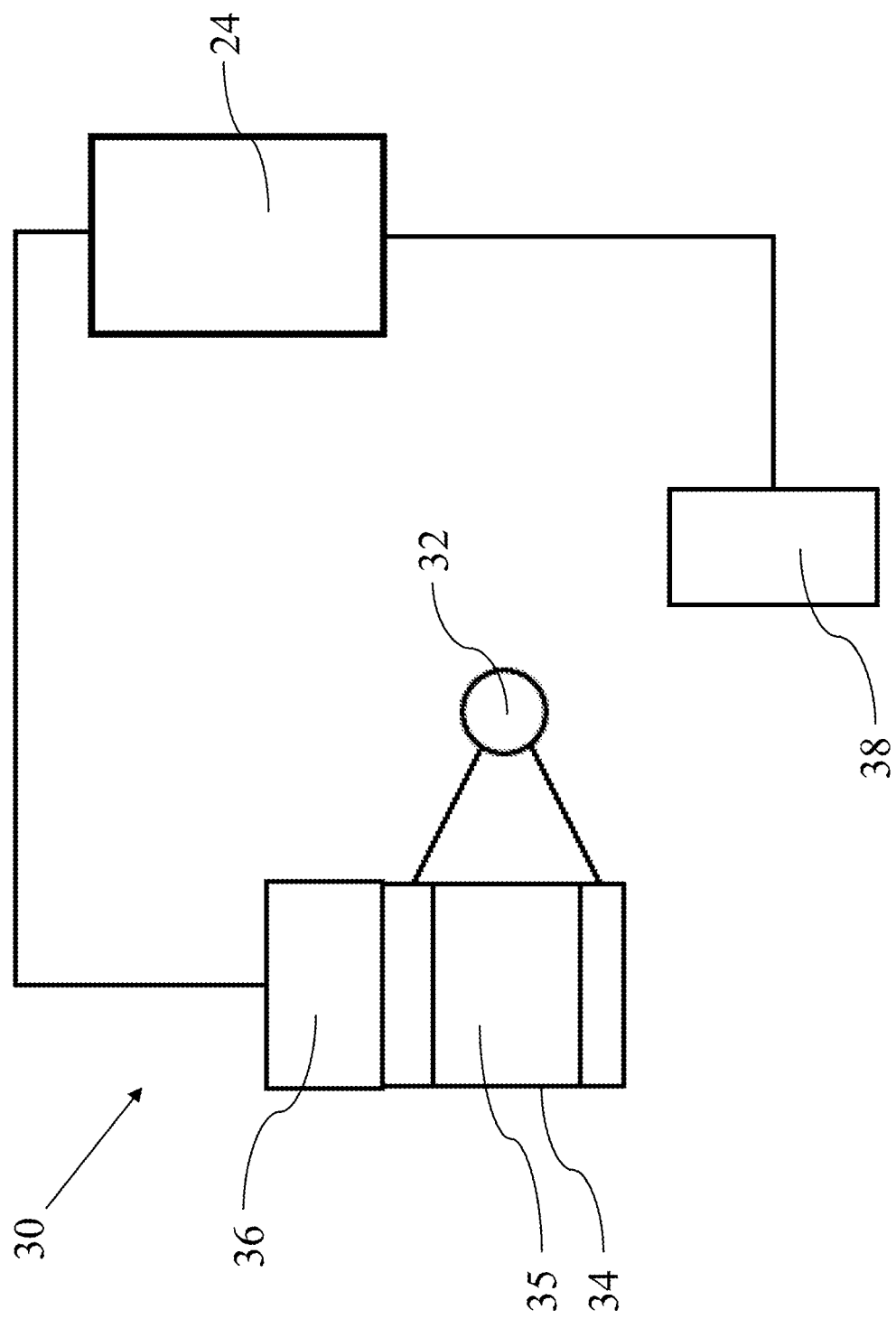
FIG. 9 is a schematic view showing the alternate air intake valve assembly.

Rotatable component 34 is connected to valve 14 such that as pivoting component 34 is rotated between the two rotational stops 36 and 38, valve 14 will change between the open position, as shown in FIG. 7, and the closed position, as shown in FIG. 6. In the unactuated state, the rotatable component 34 may be magnetically attracted to first rotational stop 36, and may be adjacent to second rotational stop 38 in the actuated state. It will be understood by those skilled in the art that the roles of first and second rotational stops 36 and 38 may also be reversed. Rotatable component 34 may also be magnetically attracted to first rotational stop 36 in the unactuated state, and to second rotational stop 38 in the actuated state. Referring to FIG. 8, electromagnetic actuator 18 is preferably designed to be covered by a cover 40. Referring to FIG. 9, magnetic gate actuator 30 is connected to controller 24.

Figure 2:
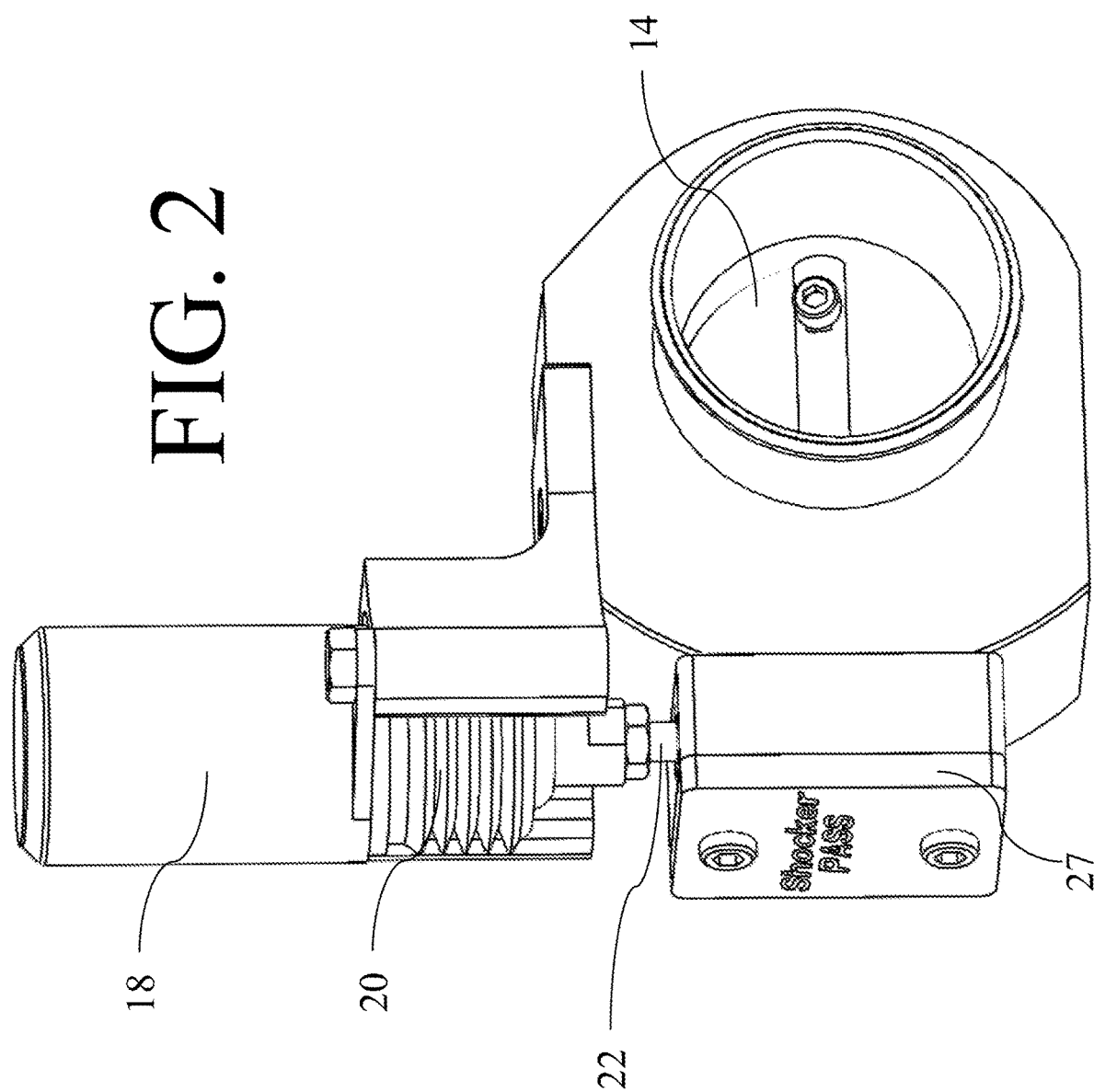
FIG. 2 is a perspective view of an air intake valve assembly with the valve in a closed position.

When one or more of the predetermined engine conditions is detected by the sensors 16, the valve 14 is actuated by electromagnetic actuator 18 and the valve 14 switches from an open position to a closed position in which air is prevented from passing into the air intake 12. Referring to FIGS. 2 and 6, when valve 14 is in the closed position, engine 10 will be forced to shut down as there is no longer a source of combustion air. Predetermined safe states are then used to determine when it is safe for the valve 14 to return to the open position. These safe states may use different measures as will be understood by one in the art, and may make use of existing sensors 16 used to detect a potential runaway state, or different sensors. For example, the predetermined safe state could be a time delay that is sufficiently long that the engine 10 will have been forced to shut down, or it may be a lower speed threshold of the engine 10, or a lower temperature of the engine 10. Alternatively, it could be a combination of safe states, or different safe states in alternatives. Once a predetermined safe state is reached, electromagnetic actuator 18 moves valve 14 to the open position, allowing air flow through air intake 12. In some embodiments, valve 14 may be biased toward the open position directly, and this may apply the force to move actuator 18 to the unactuated position once it is no longer energized. Preferably, sensors 16 and actuator 18 are controlled by a controller 24, as shown in FIG. 4. When valve 14 is biased toward the open position, controller 24 may cause the valve to return to the open position by deactivating actuator 18. Alternatively, controller 24 may activate actuator 18 to actively cause valve 14 to return to the open position. Controller 24 may also have a manual override switch 26 that a user can activate should a condition occur that is not detected by sensors 16 requiring emergency shutdown of engine 10. Controller 24 may be any type of logic controller as may be known in the art that is able to be programmed to compare signals from sensors 16 to predetermined levels and to send other signals to activate or deactivate actuator 18 as well as perform other functions or control other components based on the particular embodiment being used.

Referring to FIG. 9, when magnetic gate actuator 30 is used, valve 14 will be in the open position, as shown in FIG. 7, when the engine is running For example, stationary magnetic elements 36 and 38 may be permanent magnets with the same polarity facing magnetic element 35, which is an electromagnet without a permanent polarity, or a polarity that may be switched by applying a current. The polarity of the electromagnet or electromagnets may be changed either by switching the induced polarity in the electromagnet, or by inducing a polarity in the electromagnet when it is in a neutral state.

In the open position, magnetic element 35 is attracted to magnetic element 36 and may or may not be repelled from magnetic element 38. In order to move to the closed position, magnetic element 35 is energized such that it is repelled from magnetic element 36 and attracted to magnetic element 38. If it is desired to "latch" pivoting component 34 in the open state, magnetic element 35 may remain energized, or the system may be designed to ensure that magnetic element 35 remains attracted to magnetic element 38 when de-energized. Alternatively, the system may be designed such that, when de-energized, magnetic element 35 is repelled by magnetic element 38 and attracted to magnetic element 36 to return to a normally open position.

In another alternative, magnetic element 36 may be a permanent magnet, magnetic element 38 may be non-polarized ferrous material, and magnetic element 35 may be an electromagnet. In this example, when magnetic element 35 is energized, it is repelled by magnetic element 36 and attracted to magnetic element 38. When magnetic element 35 is de-energized, it will be neutral with respect to magnetic element 38 and attracted to magnetic element 36. This design ensures that gate actuator 30 is able to close quickly, while allowing it to be biased toward the open position when de-activated.

In other embodiments, magnetic element 35 may be a permanent magnet or non-polarized ferrous material and magnetic elements 36 and 38 may be electromagnets that control the movement of pivoting component 34 by selectively energizing and de-energizing. The various arrangements for doing so will be apparent to those skilled in the art.

While it may be desirable to design the system such that pivoting component 34 is biased toward the open position under normal conditions, it may also be designed to be reset to the open position by a user, which may apply a current or turn off a current and allow pivoting component 34 to return to the open position. In one example, pivoting component 34 may be biased to the open position by programming a controller to cause the system to activate and return pivoting component 34 to the open position once the predetermined safe state has been reached.

As depicted, there is a controller 24 that is programmed to control the activation and deactivation of some or all of magnetic elements 35, 36, and 38. If it does not occur automatically when the system deactivates, controller 24 may be programmed to cause valve 14 to return to the open position after the potential runaway state has ended and a safe state has been reached. Controller 24 may be programmed with instructions to change the polarity of at least one electromagnet to electromagnetically move the valve actuator 18 from the first position, where valve 14 is open, toward the second position, where valve 14 is closed, in response to a first activation signal. The polarity may be changed either by applying a current to the electromagnet in order to induce a polarity from a neutral state. It may also be possible to apply a current to reverse the polarity of the electromagnet, although this is less commonly done. While valve 14 may be physically or magnetically biased to return to the first position once a safe condition has been reached, valve 14 may also be biased by programming controller 24 to electromagnetically move the valve actuator 18 from the second position toward the first position in response to the second activation signal. The first and second positions are preferably defined by rotational stops 36 and 38.

As discussed above, valve actuator 18 and first and second stops 36 and 38 may be one of an electromagnet, a permanent magnet, and a non-magnetic, ferrous element, in a variety of combinations. Valve actuator 18 carries a first magnetic element 42, first stop 36 carries a second magnetic element 44, and second stop 38 may carry a third magnetic element 46, or be non-magnetic. For example, in one embodiment, the first magnetic element carried by first stop 36 is a permanent magnet, the second magnetic element is a first electromagnet, and second stop 38 carries a second electromagnet. When both first stop 36 and second stop 38 carry electromagnets, one of the electromagnets may be activated to repel the movable component, while the other electromagnet may remain deactivated, or may be activated to attract the movable component.

Alternatively, the first magnetic element may be an electromagnet, and the second magnetic element may be a permanent magnet. In this case, second stop 38 may be one of a permanent magnet, a ferrous element, or a non-magnetic stop. Preferably, the system is designed such that when the electromagnet is deactivated, the movable component 34 will continue to be attracted to either the first or second electromagnets to maintain valve actuator 18 in a position to hold valve 14 either open or closed. For example, at least one of the first and second magnetic elements may comprise a permanent magnet. As will be understood by those skilled in the art, the first, second, and third magnetic elements may be both electromagnets and permanent magnets.

By allowing valve 14 to open when actuator 18 is no longer energized, or by causing actuator 18 to open valve 14 as it returns to the unactuated position, there is much less difficulty in resetting the shut-down device. This provides an advantage over devices that may have a reset shut-down circuit or a valve that must be resent manually, as these may fail in some circumstances, or be difficult to access in others. By providing sensors that also monitor for a safe state, operators are able to simply wait until conditions are safe before starting the engine again, and feel confident that the engine will start once the runaway condition has been addressed.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of shutting down an engine having an air intake, the method comprising:
    attaching a valve to the air intake of the engine, the valve having a valve actuator that rotates the valve between an open position that allows air to pass into the air intake and a closed position that prevents air from passing into the air intake, wherein a first magnetic element is carried by the valve actuator, a second magnetic element is carried by a first stop, and a third magnetic element is carried by a second stop, wherein the first magnetic element is a permanent magnet and the second magnetic element and the third magnetic element are electromagnets, the second and third magnetic elements being energized to attract or repel the first magnetic element and wherein the valve actuator moves between a first position in which the first magnetic element is in contact with the first stop and the valve is in the open position, and a second position in which the first magnetic element is in contact with the second stop and the valve is in the closed position;
    using one or more sensors, detecting one or more predetermined engine conditions indicative of a runaway state;
    upon detecting the one or more predetermined engine conditions:
        energizing the second magnetic element to repel the first magnetic element the energized second magnetic element applying a positive, motive, and repellent magnetic force to the first magnetic element to move the valve actuator from the first position to the second position; and
        energizing the third magnetic element to attract the first magnetic element, the energized third magnetic element applying a positive, attractive force to the first magnetic element to hold the valve actuator in the second position; and
    causing the valve actuator to return to the first position once a predetermined safe state has been reached.

2. The method of claim 1, wherein the valve actuator is biased toward the first position.

3. The method of claim 1, wherein the predetermined safe state comprises a time delay.

4. The method of claim 1, wherein the at least one predetermined engine condition comprises an upper RPM threshold of the engine and the predetermined safe state comprises a lower RPM threshold of the engine.

5. An engine air intake shut off device to be attached to an air intake of an engine, the device comprising:
    a valve attachable to the air intake of the engine, the valve having an electromagnetic actuator that rotates the valve between an open position that allows air to pass into the air intake and a closed position that prevents air from passing into the air intake, wherein a first magnetic element is carried by the electromagnetic actuator, a second magnetic element is carried by a first stop, and a third magnetic element is carried by a second stop, wherein the first magnetic element is a permanent magnet and the second magnetic element and the third magnetic element are electromagnets, the second and third magnetic elements being energized to attract or repel the first magnetic element, and wherein the electromagnetic actuator is movable between a first position in which the first magnetic element is in contact with the first stop and the valve is in the open position, and a second position in which the first magnetic element is in contact with the second stop and the valve is in the closed position;
    one or more sensors that produce signals indicative of one or more engine conditions; and
    a controller having instructions that cause the controller to:
        energize the second magnetic element to attract the first magnetic element in response to a signal from the one or more sensors indicative of a runaway state, the energized second magnetic element applying a positive, motive and repellent magnetic force to the first magnetic element to move the electromagnetic actuator from the first position to the second position;
        energize the third magnetic element to attract the first magnetic element, the energized third magnetic element applying a positive, attractive force to the first magnetic element to hold the electromagnetic actuator in the second position; and
        cause the electromagnetic actuator to return to the first position once a predetermined safe state has been reached.

6. The engine air intake shut off device of claim 5, wherein the runaway state comprises an upper RPM threshold of the engine and the predetermined safe state comprises a lower RPM threshold of the engine.

7. The engine air intake shut off device of claim 5, wherein the predetermined safe state comprises a time delay.

8. A magnetic actuator apparatus comprising:
    a valve;
    a valve actuator having a first position defined by a first stop and a second position defined by a second stop, the valve actuator opening and closing the valve as the valve actuator moves between the first and second positions;
    a first magnetic element carried by the valve actuator, a second magnetic element carried by the first stop, and a third magnetic element carried by the second stop, wherein the first magnetic element is a permanent magnet and the second magnetic element and the third magnetic element are electromagnets, the second and third magnetic elements being energized to attract or repel the first magnetic element;
    a controller having instructions that cause the controller to:
        energize the second magnetic element to repel the first magnetic element and apply a positive, motive, and repellent magnetic force to move the valve actuator from the first position in which the first magnetic element contacts the first stop and the valve is in the open position to the second position in which the first magnetic element contacts the second stop and the valve is in the closed position, in response to a first activation signal;
        energize the third magnetic element to attract the first magnetic element and apply a positive, attractive force to the first magnetic element to hold the valve actuator in the second position in response to the first activation signal; and return the valve actuator to the first position in response to a second activation signal.

9. The method of claim 1, wherein both the second and the third magnetic elements are energized to apply the positive, motive magnetic force to the first magnetic element.

10. The engine air intake shut off device of claim 5, wherein both the second and the third magnetic elements are energized to apply the positive, motive magnetic force to the first magnetic element.

11. The engine air intake shut off device of claim 5, wherein the valve actuator is biased toward the first position.

12. The magnetic actuator apparatus of claim 8, wherein the valve actuator is biased toward the first position.

* * * * *